US008639215B2

(12) United States Patent
McGregor et al.

(10) Patent No.: US 8,639,215 B2
(45) Date of Patent: Jan. 28, 2014

(54) SIM-CENTRIC MOBILE COMMERCE SYSTEM FOR DEPLOYMENT IN A LEGACY NETWORK INFRASTRUCTURE

(76) Inventors: Gregory M. McGregor, Walnut Creek, CA (US); Christopher M. McGregor, Pacifica, CA (US); Travis M. McGregor, San Francisco, CA (US)

( * ) Notice: Subject to any disclaimer, the term of this patent is extended or adjusted under 35 U.S.C. 154(b) by 944 days.

(21) Appl. No.: 12/226,020

(22) PCT Filed: Apr. 4, 2007

(86) PCT No.: PCT/US2007/008630
§ 371 (c)(1),
(2), (4) Date: Oct. 6, 2008

(87) PCT Pub. No.: WO2007/117632
PCT Pub. Date: Oct. 18, 2007

(65) Prior Publication Data
US 2009/0275363 A1 Nov. 5, 2009

Related U.S. Application Data

(60) Provisional application No. 60/790,135, filed on Apr. 7, 2006.

(51) Int. Cl.
*H04M 11/00* (2006.01)
(52) U.S. Cl.
USPC ............. 455/406; 455/410; 705/39; 705/44; 705/52
(58) Field of Classification Search
USPC .......................... 455/406, 410; 705/39, 44, 52
See application file for complete search history.

(56) References Cited

U.S. PATENT DOCUMENTS

| | | | |
|---|---|---|---|
| 6,694,134 B1 | 2/2004 | Lu et al. | |
| 7,280,847 B2 * | 10/2007 | Goldthwaite et al. | 455/558 |
| 7,490,062 B2 * | 2/2009 | Hansmann et al. | 705/39 |
| 7,596,373 B2 | 9/2009 | McGregor et al. | |
| 7,983,987 B2 * | 7/2011 | Kranzley et al. | 705/44 |
| 2002/0022472 A1 | 2/2002 | Watler et al. | |
| 2003/0014659 A1 | 1/2003 | Zhu | |
| 2004/0029570 A1 * | 2/2004 | Knorr et al. | 455/414.1 |
| 2004/0087339 A1 * | 5/2004 | Goldthwaite et al. | 455/558 |
| 2004/0176134 A1 * | 9/2004 | Goldthwaite et al. | 455/558 |
| 2004/0260791 A1 | 12/2004 | Jerbi et al. | |
| 2005/0114261 A1 | 5/2005 | Lin | |
| 2005/0160046 A1 * | 7/2005 | Dupre et al. | 705/52 |
| 2005/0177517 A1 | 8/2005 | Leung et al. | |
| 2006/0016878 A1 * | 1/2006 | Singer et al. | 235/380 |
| 2006/0236092 A1 | 10/2006 | Hamalainen | |
| 2007/0063017 A1 * | 3/2007 | Chen et al. | 235/379 |
| 2007/0226805 A1 * | 9/2007 | Jeal et al. | 726/27 |
| 2007/0294744 A1 | 12/2007 | Alessio et al. | |

\* cited by examiner

*Primary Examiner* — Liton Miah
(74) *Attorney, Agent, or Firm* — Richard Esty Peterson

(57) ABSTRACT

A financial transaction processing system in a legacy financial transaction network for wireless mobile handset devices having an internal SIM or USIM under control of a service provider in a wireless communication network connected to an open world communication network in which the SIM or USIM has a secure part of an account management application that manages a financial account in the handset and adjusts the financial account when the user of the handset communicates a number related to the mobile number of the handset to a legacy remote card terminal which routes the number and transaction data to the secure link server of the service provider.

18 Claims, 2 Drawing Sheets

SIM-CENTRIC MOBILE COMMERCE SYSTEM FOR DEPLOYMENT IN A LEGACY NETWORK INFRASTRUCTURE

CROSS-REFERENCE TO RELATED APPLICATIONS

Applicants claim the priority date of U.S. Provisional Application Ser. No. application 60/790,135, filed Apr. 7, 2006, and, International Application No. PCT/US2007/ 008630 filed, Apr. 4, 2007, both of the same title.

BACKGROUND OF THE INVENTION

This invention relates to a financial transaction processing system, using wireless mobile devices having an internal SIM or USIM to manage subscription accounts in conjunction with a communication system provider to enable the wireless mobile device to interact with an ordinary financial transaction network, typically used for commercial transactions with credit cards and debit cards.

The use of mobile wireless handset devices has heretofore been limited. Previous attempts to utilize the wireless communication capabilities of handset devices, such as wireless mobile phones for mobile commerce, has been restricted to portals in the telecommunications network and to portals in the world wide web that have been designed to cater to small, wireless mobile devices of limited capabilities. While adoption of wireless m-commerce platforms is expanding, the mobile wireless device is excluded from the real world marketplace because of legacy financial transaction processing equipment.

Directly using the communication capabilities of mobile phones and other wireless portable digital devices in the retail marketplace requires that the remote terminal at the retail establishment have wireless communication capabilities. Future remote terminals will likely incorporate wireless capabilities allowing direct communication between the wireless mobile device and the remote terminal. The system here devised not only enables the wireless mobile device to engage in financial transactions with entities having such wireless communication capabilities, but also with existing legacy systems, particularly credit and debit card terminals.

SUMMARY OF THE INVENTION

The SIM-based financial transaction processing system of this invention adapts our concept of control points in a wireless communication network to enable secure m-commerce (mobile commerce) from wireless mobile handsets. Control points are specific locations in a telecommunication network where the data stream can be monitored and altered under direction of the controlling entity. In a SIM-based mobile communication system, each wireless mobile device has a SIM or USIM that is coded under control of the wireless mobile system operator to authenticate the subscriber to the mobile network. The mobile system operator has total control over its linking server that communicates with the wireless mobile devices deployed by the mobile operator. The server link enables secure encrypted messages to be passed between the wireless mobile devices and the link server.

The acronym SIM represents Subscriber Identity Module. Similarly, the acronym USIM represents Universal Subscriber Identity Module. In practice, a SIM is a physical and logical entity in the form of an Integrated Circuit Chip (ICC), wherein the SIM and USIM are applets or applications that validate the identity of the subscriber, at least to the issuer of the SIM and USIM. In a 2G (Second Generation) telecommunication network, the module for subscriber identity may be hardwired to the ICC and considered as a single physical and logical entity defining access conditions to a secure environment. In 2+G networks and 3G (Third Generation) networks, the ICC includes an application layer for applications in addition to the identity application of the SIM. A Universal Integrated Circuit Chip (UICC) is the platform or operating system on which applications in a USIM can be built. The UICC is a platform independent layer specified in 3G TS 31.101, and can accommodate a full featured financial transaction processing system of the type proposed. With SIM for 2+G and USIM for 3G, value added services are possible for wireless mobile systems that include wireless mobile communication devices of limited capabilities, typically handsets such as teleconnected PDAs and cell phones.

However, as noted, the avenues for implementation of financial services are limited, since the remote network terminals customarily deployed into the retail market to process financial transactions are not yet equipped to directly communicate with wireless mobile devices. These legacy terminals generally process financial transactions through the medium of a card reader to identify and verify card holder accounts represented by credit cards and debit cards that are presented by a customer. The physical cards are swiped or inserted into a reader where account and identity information is read from a magnetic strip and verified by a network communication via a modem to the issuer or representative of the issuer, who can elect to authorize or deny the transaction.

The SIM-based financial transaction processing system of this invention enables the wireless mobile handset device to engage in financial transactions with improved security and uniquely using the existing infrastructure of conventional credit card and debit card terminals.

In a SIM-based mobile communication system, wireless mobile devices (most commonly mobile phones) are managed by a service provider under a subscription agreement with users. Usually, the mobile operator that manages the deployment and operation of the mobile phones in the network and the service provider that manages the subscription agreements with the users are one and the same. Here, for convenience, the account manager and mobile operator, when co-acting, are identified as the service provider.

The secure encrypted server link to the SIM (or USIM) in the wireless device provides two control points for low risk management of financial transactions in addition to traditional management of call charges in accord with the terms of subscription agreements. With control of the secure link server and control of the coded SIM/USIM in each mobile device, the service provider can monitor and manage both the call account and the financial transaction account for each of its subscribers. This coordinated account control also permits individual subscriber account management to be delegated to the SIM or USIM in the subscriber's mobile device, thereby creating a distributed, SIM-centric financial transaction management system.

In this specification, it is to be understood that the use of the term "SIM" also includes "USIM" unless otherwise indicated. Generally, the mobile operator in the described system has oversight, control and ultimate responsibility for managing the mechanics of the subscriber account that resides in the SIM/USIM of the subscriber's mobile device. The SIM/USIM is secure from the subscriber as well as the user of the wireless device, who is usually, but not always, the same person as the subscriber.

With control of the security for the secure link server and control of a path for secure communications between the link server and the wireless mobile device and, hence, the contained SIM or USIM in a particular device, a mobile operator can control a SIM-based financial account by a SIM-based account management application or applet that is pre-programmed to the uniquely identified SIM or USIM by the mobile operator. When the mobile operator also controls the management of subscriber accounts and assumes the role of a service provider for wireless mobile device users, then the business model for managing a controlled network of wireless mobile devices in the open telecommunication and internet arena is within the discretion of the mobile operator as the service provider.

Conveniently, by delegating the micromanagement of a subscriber's account or accounts to the SIM/USIM of the subscriber's wireless mobile device and by directing transaction authorization inquiries to a SIM-centric account manager in the subscriber's handset, a powerful financial transaction processing system can be implemented with minimal costs. The individual wireless mobile devices become distributed processors in a network regulated by the service provider through protocols devised by the service provider to implement its business model. For example, the service provider may elect to be the guarantor of the financial transactions processed, or elect to collaborate with a financial entity or institution that is an ultimate guarantor or sponsor for the financial transactions of the subscribers when using their subscription account.

The call or communication events are traditionally the responsibility of the mobile phone service provider. Experience with call charge risks enables prediction of financial transaction risks. Within pre-defined limits, the mobile phone service provider is therefore in a unique position to assume the additional risk of financial transactions. The service provider has the ability to determine the parameters for charges against the accounts, including call charges and/or transaction charges. Since the service provider is able to monitor the distributed accounts and control the avenue to securely communicate with the discrete account processors in the SIM/USIM, the service provider can allow the real time micromanagement of the accounts to be delegated to the programmed SIM/USIM in the particular subscriber's mobile device. The very distributed nature of the account processing distributes and limits the risks. Unlike a conventional centralized authorization center, a substantially risk-free authorization for a financial transaction in the invented system is delegated to the account management application in the SIM/USIM according to a real-time determination of the subscriber account status in the mobile device.

A preferred SIM-centric account management system for financial transactions can be implemented by a service provider to provide for m-commerce in the retail market place with legacy equipment. For example, a user of a subscription mobile device in a wireless network concludes a purchase transaction by communicating the mobile number or a pointer to the mobile number to the sales person. This may be done orally or by a subscriber card having a magnetic stripe. The mobile number (or pointer to a resource having the mobile number) together with the transaction data including the amount of the charge, is entered into the retailer's charge or debit terminal. The retailer's remote terminal connects to the internet, and the information is routed to the service provider's link server for account verification and initial account control. If the transaction is within the transaction account limits as defined by the service provider, the secure link server of the service provider queries the SIM-centric account manager in the subscription device (wireless handset) through the secure wireless communication link. The SIM-centric account manager in the subscription device then audits the account to determine if the account status can cover the charge. If yes, the subscriber's device prompts the user for approval. If approved, for example, by pressing a particular key, the approval or authorization is returned through the secure communication link to the link server of the service provider and forwarded to the remote terminal of the retailer. Concurrently the SIM-centric account manager adjusts the account to reflect the charge from the retailer and the transaction is concluded. In the situation where the service provider is collaborating with a sponsor, such as a bank, the transaction data is first routed to the sponsor and forwarded to the service provider as an authorization authority. The service provider sends a secure message to the wireless mobile device with the specified mobile number. When the transaction is approved as described and the internal transaction account has been adjusted to reflect the charge, a receipt is passed by a secure message to the link server of the service provider and then forwarded to the sponsor. The mechanics of the process can be varied to accommodate different levels of security desired, for example, by requiring a PIN (Personal Identification Number) on different levels of risk that are acceptable.

DETAILED DESCRIPTION OF THE PREFERRED EMBODIMENTS

Figure 1:
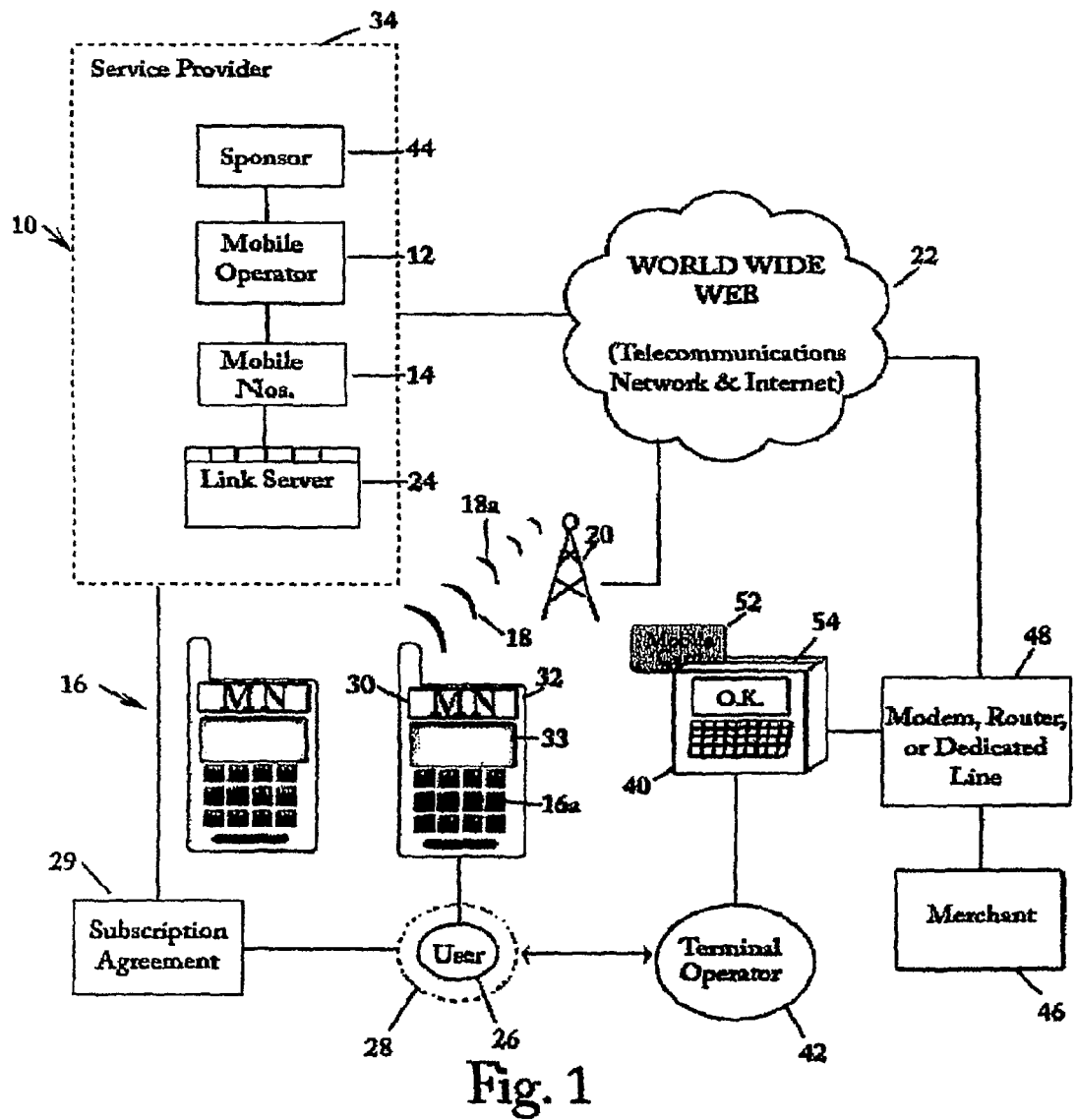
FIG. 1 is a schematic illustration of the SIM-based financial transaction processing system.

The SIM-based financial transaction processing system of this invention, designated generally by the reference numeral 10 in FIG. 1, comprises a hardware system and processing method for use of wireless mobile devices having an internal SIM or USIM in mobile commerce (m-commerce). The SIM-based financial processing system of this invention uniquely enables the wireless mobile device to engage in financial transactions with the legacy system of remote terminals that typically process credit card and debit card transactions and do not have the capability to wirelessly communicate with wireless mobile devices.

In addition, the SIM-based financial transaction processing system of this invention provides for a distributed system of subscriber account management, wherein the SIM or USIM in each wireless mobile device, such as a mobile phone, functions as a discrete transaction processor, thereby eliminating the necessity for a central processing center or transaction authorization center. Not only is the cost of such a financial transaction processing system dramatically reduced, but the risk is distributed and the security is maximized by the control the system provider has on the secure communication link between the SIM or USIM in the mobile device and the secure link server of the mobile operator.

Typically, a mobile operator manages a number of wireless mobile devices under a contract with the users of the devices. In this arrangement, the users are subscribers to a communication service, such as a mobile phone service, and the mobile operator is a service provider, who not only maintains the controlled network of subscriber devices in the open communication network, but also manages the payment system under a variety of optional payment plans.

In order to minimize the communication traffic between the service provider and the mobile terminals under its control, the mobile operator can delegate account management for calls to the discrete mobile devices. In 2+G and 3G phone systems, highly sophisticated account management protocols which are secure from the user can be coded into the SIM or USIM in the mobile device for managing call charges and the subscriber's subscription account. In this manner, the use of the mobile device is regulated, removing risk from the operator that the contractual limits of use as set forth in the subscription agreement are not exceeded. The ability to control internal accounts in the mobile device by protocols devised by the mobile operator that are secure from the users enables use of the wireless mobile device for mobile commerce.

Heretofore, such efforts have enlisted the communication capabilities of the wireless mobile device to initiate a dialog with a merchant for selection and purchase of goods and services. Wireless mobile devices having internet capabilities enabling connection to internet portals tailored to mobile handset devices has been the prime avenue being implemented for m-commerce. Interaction with brick and mortar merchants is limited by the legacy wire-based terminals used for the common credit card and debit card transaction. Direct wireless communication between the mobile device and the merchant's store terminal requires that the remote terminal have RF capabilities. This requires a system upgrade that will likely be slow to implement.

The SIM-centric account manager of this invention enables a wireless mobile device, having network communication capabilities under control of a SIM/USIM in the device, to engage in financial transactions with legacy card reader terminals common to brick and mortar world merchants.

A preferred embodiment of the SIM-based financial transaction processing system 10 is illustrated in the network diagram of FIG. 1. In FIG. 1, a network operator, designated by diagram box 12, has a stable of mobile numbers (MN) represented by diagram box 14 that it can deploy in wireless mobile devices 16, such as the wireless PDA/phone handsets 16a. The mobile operator 10 can release the wireless mobile devices 16 into the open world communication network, if the mobile operator assumes financial responsibility for the actions (or at least the transactions) of the devices 16 as they roam in a worldwide landscape that may only in part include the telecommunication network and the internet.

Control of the wireless mobile devices 16 by the mobile operator 10 is first established by control of the secure server link 18 represented schematically as a radio frequency transmission 18a from a transmission tower or antenna 20. The radio-transmitter 20 may be part of the controlled network of the mobile operator 10 or accessed via the avenue of the worldwide web 22, for example, through agreements with other service and system providers. The secure server link 18 enables encrypted messages to be passed between a server 24 under total control of the mobile operator 10 and each wireless device 16.

The wireless mobile devices 16 are in the possession of users 26, a weak link in the chain of responsibility. A user 26 is controlled by the mobile operator 10 through an agreement with a subscriber 28 who takes possession of the mobile device 16 pursuant to a contract with conditions for use as dictated by the mobile operator. Frequently, the subscriber 28 is the same as the user 26 who actually operates the mobile handset 16a. However, when the user 26 is not the subscriber 28, the subscriber assumes responsibility for the user and may restrict the user from access to certain of the services available to the subscriber.

Control of the subscriber 28 is first established by contract with a subscription agreement 29 and then is maintained by control of the operation of the wireless mobile device 16. Although mobile communication devices typically include an internal processor, in 2G and 3G systems, this internal processor is relegated to managing the operations of the mobile device and its interaction with the user and network. Security and protection of the primary asset of the mobile operator, the mobile number, is maintained by the SIM or USIM. The SIM or USIM is a secure integrated circuit chip and, in the case of the USIM, an encapsulated operating system for not only establishing and validating an identity, but controlling access to restricted resources including applications.

When the mobile operator is the issuing authority for the SIM/USIM, it controls the identity of the device assigned to the MN. Except when access is permitted, the SIM/USIM is secure from the user and subscriber as well as the open network at large. This second control point enables the mobile operator 10 to regulate the operation of the mobile device 16 in the open network environment.

In 2+G and 3G systems, the restricted resource may include small application programs installed by the mobile operator 10. In the preferred embodiment of this invention, the SIM/USIM 30 in the mobile handset 16a has a SIM-centric transaction manager 32 that is a small application program that micromanages an account or accounts on behalf of a subscriber 28 under oversight of the mobile operator 10 according to the subscription agreement 29 with the subscriber 28. In this manner, the mobile operator 10 is a service provider 34 that receives renumeration for services provided to the subscriber 28 for use of the wireless mobile device 16 in a telecommunication network.

Figure 2:
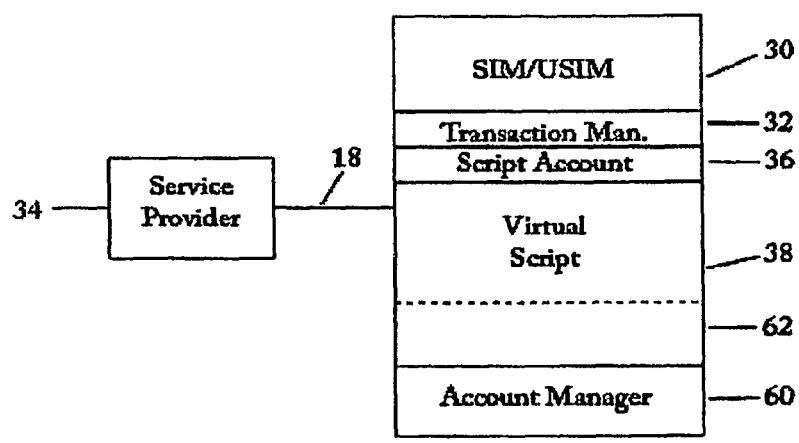
FIG. 2 is a block diagram of the handset account management application.

In the preferred embodiment of this invention, the mobile operator/service provider (10, 34) encodes the SIM/USIM 30 with the tailored SIM-centric transaction manager 32 that enables micromanagement of a script account 36 for financial transactions at the mobile device level as schematically depicted in FIG. 2.

The script account 36 contains virtual script 38 issued by the service provider 34 according to rules established by the mobile operator/service provider 34. The rules are set in protocols in the microprogram of the SIM-centric transaction manager 32.

In this invention, the virtual script 38 issued by the service provider 34 is made available for financial transactions in a manner that simulates debit card and credit card transactions. For example, the value of the virtual script in the script account 36 may be discounted or increased according to the transaction, according to the nature of the goods or services acquired, or the identity of the merchant. Other fees, charges or credits may be included according to the business model adopted by the service provider 34. Virtual script 38 is issued to the script account 36 in the SIM/USIM of the wireless mobile device by the service provider 34 via the secure server link 18. The amount of virtual script issued depends on the subscription agreement and may equal or be discounted from the monetary value of any payment or credit charge made by the subscriber 28 to the service provider 34. For example, the subscriber 28 may have a monthly payment plan requiring fixed payments for a basic telecommunication service for a particular type of wireless mobile device. Excess calls and charges within limits may be added to the next monthly bill. Alternately, a subscription period and a script account having a set amount of virtual script may be all funded in advance by cash, credit or check at the time the subscriber takes possession of the wireless mobile device with the installed SIM or USIM. The wireless mobile device can be operated until the script account is emptied.

When the virtual script in the script account is low or exhausted, in an alternate embodiment the account may be increased by the subscriber contacting the service provider, and charging or paying for a new issuance of script. Alternately, an increase in the script account can be accomplished by telecommunicating the code of a voucher or phone card to the service provider, or, in other ways common in the telecommunications industry.

The script account 36 is used in mobile commerce in multiple ways as noted. In the example of FIG. 1, a wireless mobile handset 16*a* is used to process a financial transaction at a financial transaction terminal 40 that does not have wireless capabilities. The user 26 of the wireless handset 16*a*, acting as a customer, communicates orally with the terminal operator 42 during the purchase of goods or services. In one preferred embodiment, the ten-digit mobile number (MN) of the subscriber's wireless mobile device 16 is combined with a six-digit prefix that is an ANSI certified credit card prefix assigned to an issuing institution. This creates a sixteen-digit number that is the equivalent to a credit card or debit card number. In the example of FIG. 1, the institution or financial sponsor 44 that is issued the prefix and is the guarantor of the financial transaction according to customary financial practices, is the same entity as the service provider 34. However, it is to be understood that a separate entity may collaborate with the service provider as a sponsor 44.

In the example of FIG. 1, the terminal operator 42 or user 26 keys in the ANSI prefix and MN and the terminal operator 42 adds the details of the purchase. The account data and transaction data are sent by an authorization modem 48 router or open ethernet line under the control of the merchant 46 to the open world wide web 22 using existing protocols and standards for processing credit card transactions.

The combined account and transaction data are routed to the ANSI prefix institution, here the service provider 34, for authorization. The service provider 34, which intermittently monitors the internal accounts of the wireless mobile device, extracts the MN, compares the purchase charge to the likely available amount of virtual script in the script account associated with the MN. If the amount of the charge is over the value of script in the account, the transaction authorization is denied. If it is likely the amount is within the value of virtual script remaining in the script account for the MN, the service provider 34 sends a secure message to the mobile wireless device 16, wherein the SIM/USIM, using the SIM-centric account manager, determines whether the charge amount can be covered by the virtual script remaining in the account. If it can, the SIM-centric account manager 32 prompts the user 26 for approval, for example, by a ring tone and visual message on the handset screen 50. If the O.K. given is, for example, by a key acknowledgement, the approval is returned by the mobile device 16 using a secure wireless message to the link server 24. The secure messaging can utilize SMS or Beaver IP or other secure communication services. The service provider then relays the authorization through the worldwide web to the transaction terminal 40 for viewing by the terminal operator 42 or user 26 to complete the transaction.

To facilitate the purchase, the subscriber 28 is issued an account card 52 having a magnetic strip encoded with the ANSI prefix and MN for entry of this data into the terminal 40 by sliding the card in a card slot 54.

When the transaction is approved for completion, the SIM-centric account manager deducts the charge from the virtual script in the script account.

The foregoing financial transaction process parallels a charge card transaction. For added security, the process can include a PIN number known to the user 26 and service provider 34. In this case, when the terminal 40 inquires if this is a debit transaction, and if the user indicates yes, the subscriber's pin number is entered and the processing of the transaction parallels a debit transaction. In this manner, the subscriber 28 can restrict access to the script account and prevent a user from authorizing charges to the subscriber's script account.

In the event that the service provider 34 requires that the subscriber account be audited in real time, the SIM/USIM includes a SIM-centric account manager 60 that includes a script account 62 for managing use charges as the wireless mobile device roams in the telecommunication network and engages in telecommunication events, such as calls and media entertainment. This script account 62 may be separate from, or combined with, the script account 36 for financial transactions. In that manner, the audit of account status can determine if the available issued script in the account or accounts will be adequate to cover communication charges and financial transaction charges combined. With the real time account management distributed to the wireless mobile devices 16 under control of the service provider 34, the financial risk to the service provider 34 is minimized. Furthermore, with the real-time account management residing in the wireless mobile device 16, the user 26 can access the account to view the status in the device's display 33.

It is to be understood that the SIM-based financial transaction processing system of this invention can be modified to accommodate different business models. For example, the retail merchant may have a merchant card or membership card that is used in the remote transaction processing terminal 40 to initiate the transaction. The membership card may include the customer's mobile phone number for m-commerce as well as an ANSI prefix identifying the merchant or the merchant's financial institution. The purchase data is routed to the prefix entity and the transaction data is then forwarded to the link server 24. The link server 24 extracts the MN and sends a secure SMS or Bearer IP to the wireless mobile device 16 having the MN. The transaction is processed by the SIM-centric account manager and, after a positive audit, approval notification is relayed to the subscriber or authorized user for final approval as previously described.

Where the service provider 34 as issuer of the SIM/USIM is willing to take additional risk, the final approval step can be waived for transactions of limited value. In this case, the service provider 34 has a history of the subscriber's account or accounts and, as noted, periodically monitors the accounts when convenient, for example, during times of low traffic. In this manner, the transaction can be completed even when the mobile device is off.

To improve security, the SIM-centric transaction manager may include a transaction specific PIN number generator coordinated with a mirror number generator in the link server for generating a unique PIN for each financial transaction. The PIN number generator can comprise a key number and transaction counter (or numerical date) with an algorithm that generates a unique PIN for each financial transaction.

The PIN number can be presented as a screen prompt to the user by the SIM-centric account manager without a communication dialog with the link server.

Alternately, when the ANSI prefix and MN are entered, an account alert is routed to the link server which forwards a transaction specific PIN to the user via the secure server link 18. The user enters the PIN in the remote terminal 40 and the transaction data is routed to the link server 24 for the approval process as previously described. This process causes a slight delay and the generation of a PIN by the internal SIM-centric account manager is preferred.

The use of a PIN in these two situations does not prevent an authorized or unauthorized user in possession of the handset from accessing the subscriber's script account. For such protection, a PIN known only to the subscriber as previously described or a biometric lock or biometric PIN generator is required.

It is to be understood that other variations are possible, since control of the two control points enabling control of the secure server link with the wireless mobile devices can reside with a single entity. With this level of security, the identity of the account and identity of the guarantor institution can be sent over the open internet without encryption. This allows features for the convenience of the user. For example, a user prompts the wireless mobile device that the user in possession of the handheld device wants to do a financial transaction. One or more prefixes are displayed with the identity of the bank, sponsor, merchant or other entity for the subscriber's account or accounts. The user can then easily select the appropriate prefix to be given to the terminal operator for entry. Alternately, as noted, the prefix can be entered by the user together with the easily recalled telephone number for initiating the commercial transaction that proceeds to conclusion at the script account managed by the SIM-centric account manager as previously described.

Although the subscriber 28 does not have direct access to the SIM/USIM to alter the subscription accounts, the SIM/USIM account manager application in a preferred embodiment maintains a real record of transactions and/or charges for each account and/or combined accounts and generates a report that is accessible by the subscriber. Depending on the memory available, the report may provide a screen view of the last five transactions or charges, or may cover the entire history. This may be provided automatically after each transaction or charge, or by a user prompt. It is to be understood that this view may be password protected to prevent authorized and/or unauthorized users 26 from viewing the account records. The service provider 34 may restrict the view to a limited number of transactions or simply to the account balances according to the subscription agreement 29, and services offered by the service provider.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

The invention claimed is:

1. A distributed financial transaction processing system in a financial transaction processing network for wireless mobile handset devices having an internal SIM or USIM under control of a wireless mobile system operator in a wireless communication network connected to an open world communication network comprising:
   a service provider having a secure link server in part under initial control of the wireless mobile system operator, wherein the service provider provides mobile communication services to users of the wireless mobile handset devices in the communication network;
   at least one wireless mobile handset device having an internal SIM or USIM under initial control of the wireless mobile system operator wherein secure messages can be exchanged between the secure link server and the wireless mobile handset device that are secure from a user of the wireless mobile handset device; and,
   an account management application, at least in part coded in the SIM or USIM of the wireless mobile handset device initially controlled by the wireless mobile system operator wherein the account management application has a financial account within the wireless mobile handset device that is secure from a user of the wireless mobile handset device and is in part managed by the account management application that is in part coded in the SIM or USIM of that wireless mobile handset device for a user of the wireless mobile handset device;
   wherein the financial transaction processing network has remote terminals, and wherein a financial transaction is communicated to one of the remote terminals and transaction data related to the financial transaction is processed by the financial transaction processing network,
   wherein transaction data related to the financial transaction is routed by the remote terminal to the secure link server and the secure link server sends a secure message to the user's wireless mobile handset device,
   wherein the transaction data routed to the user's wireless mobile handset device includes a user approval prompt wherein the wireless mobile handset device prompts the user to signal an approval, and,
   wherein the account management application adjusts the financial account within the wireless mobile handset device to reflect a charge from the financial transaction.

2. The financial transaction processing system of claim 1 wherein the transaction data is routed by the secure link server to the wireless mobile handset device in real time.

3. The financial transaction processing system of claim 1 wherein the secure link server optionally approves a financial transaction and subsequently routes the transaction data to the user's wireless mobile handset device wherein the financial account in the wireless mobile handset device is adjusted.

4. The financial transaction processing system of claim 1 wherein virtual script is issued to the financial account in the wireless mobile handset device according to a business model adopted by the service provider.

5. The financial transaction processing system of claim 1 wherein the financial transaction communicated to one of the remote terminals includes a financial transaction processing number.

6. The financial transaction processing system of claim 5, wherein the wireless mobile handset device has a mobile number and the financial transaction processing number is the mobile number of the wireless mobile handset device.

7. The financial transaction processing system of claim 6 wherein the financial transaction processing number has an ANSI prefix identifying a financial entity in addition to the mobile number of the wireless mobile handset device.

8. The financial transaction processing system of claim 7 wherein the transaction data is routed by the remote terminal to the financial entity before routing to the secure link server for approval.

9. The financial transaction processing system of claim 6 wherein the financial transaction processing number has a user PIN in addition to the mobile number of the wireless mobile handset device.

10. The financial transaction processing system of claim 5 wherein the financial transaction processing number is carried on a magnetic strip on a card and is communicated to the remote terminal by a conventional card swipe by the user.

11. The financial transaction processing system of claim 1 wherein the financial transaction is communicated to one of the remote terminals by the wireless mobile handset device.

12. The financial transaction processing system of claim 1 wherein the financial transaction is communicated to the remote terminal orally by a user of the wireless mobile handset device and entered manually into the terminal by a terminal attendant.

13. The financial transaction processing system of claim 1 wherein the financial account managed by the account management application resides in the SIM or USIM.

14. The financial transaction processing system of claim 1 wherein the user has limited access to the financial account managed by the account management application wherein the access is limited to viewing the status of the account.

15. The financial transaction processing system of claim 1 wherein the message prompts the user of the wireless mobile handset device.

16. The financial transaction processing system of claim 15 wherein the user is prompted with a visual message for approval of the financial transaction, and on approval, the account management application adjusts the financial account within the wireless mobile handset device to reflect a charge from the financial transaction.

17. The financial transaction processing system of claim 1 wherein the user has access to view the status of the account on the wireless mobile handset device.

18. The financial transaction processing system of claim 1 wherein the financial account managed by the account management application resides in the wireless mobile handset.

* * * * *